(12) United States Patent
Skoryukina et al.

(10) Patent No.: US 11,574,492 B2
(45) Date of Patent: Feb. 7, 2023

(54) EFFICIENT LOCATION AND IDENTIFICATION OF DOCUMENTS IN IMAGES

(71) Applicant: Smart Engines Service, LLC, Moscow (RU)

(72) Inventors: Natalya Sergeevna Skoryukina, Moscow (RU); Vladimir Viktorovich Arlazarov, Moscow (RU); Dmitry Petrovich Nikolaev, Moscow (RU); Igor Aleksandrovich Faradjev, Moscow (RU)

(73) Assignee: SMART ENGINES SERVICE, LLC, Moscow (RU)

( * ) Notice: Subject to any disclaimer, the term of this patent is extended or adjusted under 35 U.S.C. 154(b) by 113 days.

(21) Appl. No.: 17/237,596

(22) Filed: Apr. 22, 2021

(65) Prior Publication Data
US 2022/0067363 A1  Mar. 3, 2022

(30) Foreign Application Priority Data

Sep. 2, 2020  (RU) ................. 2020129039

(51) Int. Cl.
| | |
|---|---|
| *G06K 9/46* | (2006.01) |
| *G06K 9/66* | (2006.01) |
| *G06V 30/413* | (2022.01) |
| *G06K 9/62* | (2022.01) |
| *G06V 10/40* | (2022.01) |

(Continued)

(52) U.S. Cl.
CPC ......... *G06V 30/413* (2022.01); *G06K 9/6232* (2013.01); *G06V 10/40* (2022.01); *G06V 10/44* (2022.01); *G06V 10/757* (2022.01); *G06V 10/758* (2022.01); *G06V 30/418* (2022.01); *G06V 30/10* (2022.01)

(58) Field of Classification Search
None
See application file for complete search history.

(56) References Cited

U.S. PATENT DOCUMENTS 6,310,984 B2 * 10/2001 Sansom-Wai .......... G06V 10/24
382/173
8,705,836 B2 *  4/2014 Gorski ................. G06V 30/274
382/137

(Continued)

OTHER PUBLICATIONS

Attivissimo et al., "An automatic reader of identity documents." In 2019 IEEE International Conference on Systems, Man and Cybernetics (SMC), pp. 3525-3530. IEEE, 2019. (Year: 2019).*

(Continued)

*Primary Examiner* — Feng Niu
(74) *Attorney, Agent, or Firm* — Procopio, Cory, Hargreaves & Savitch LLP

(57) ABSTRACT

Efficient location and identification of documents in images. In an embodiment, at least one quadrangle is extracted from an image based on line(s) extracted from the image. Parameter(s) are determined from the quadrangle(s), and keypoints are extracted from the image based on the parameter(s). Input descriptors are calculated for the keypoints and used to match the keypoints to reference keypoints, to identify classification candidate(s) that represent a template image of a type of document. The type of document and distortion parameter(s) are determined based on the classification candidate(s).

26 Claims, 6 Drawing Sheets

(51) Int. Cl.
  *G06V 10/75* (2022.01)
  *G06V 10/44* (2022.01)
  *G06V 30/418* (2022.01)
  *G06V 30/10* (2022.01)

(56) References Cited

U.S. PATENT DOCUMENTS

| | | | |
|---|---|---|---|
| 9,298,979 B2* | 3/2016 | Nepomniachtchi | H04N 1/00718 |
| 9,652,688 B2* | 5/2017 | Jean | G06V 10/462 |
| 9,672,510 B2* | 6/2017 | Roach | G06V 10/28 |
| 9,710,702 B2* | 7/2017 | Nepomniachtchi | H04N 1/00734 |
| 9,886,628 B2* | 2/2018 | Nepomniachtchi | G06V 30/40 |
| 10,303,937 B2* | 5/2019 | Nepomniachtchi | G06V 10/28 |
| 10,373,012 B2* | 8/2019 | Jean | G06V 30/418 |
| 10,628,702 B1* | 4/2020 | Gerstner | G06V 30/414 |
| 10,685,223 B2* | 6/2020 | Nepomniachtchi | H04N 1/00718 |
| 10,747,994 B2* | 8/2020 | Sridharan | G06V 30/418 |
| 11,182,640 B2* | 11/2021 | Jean | G06V 30/418 |
| 2012/0281077 A1* | 11/2012 | Canero Morales | G06V 10/143 348/61 |
| 2013/0120595 A1* | 5/2013 | Roach | H04N 5/225 348/207.1 |
| 2013/0155474 A1* | 6/2013 | Roach | G06Q 20/387 358/473 |
| 2013/0287265 A1* | 10/2013 | Nepomniachtchi | H04N 1/00708 382/115 |
| 2014/0032406 A1* | 1/2014 | Roach | G06Q 20/10 705/42 |
| 2014/0037184 A1* | 2/2014 | Gorski | G06V 30/274 382/137 |
| 2016/0148074 A1* | 5/2016 | Jean | G06F 16/5854 382/190 |
| 2016/0283787 A1* | 9/2016 | Nepomniachtchi | H04N 1/00734 |
| 2017/0220886 A1* | 8/2017 | Cañero Morales | G06V 10/48 |
| 2017/0255840 A1* | 9/2017 | Jean | G06V 10/464 |
| 2017/0270508 A1* | 9/2017 | Roach | G06V 30/40 |
| 2017/0316263 A1* | 11/2017 | Nepomniachtchi | G06V 10/28 |
| 2018/0181808 A1* | 6/2018 | Sridharan | G06K 9/6269 |
| 2018/0232572 A1* | 8/2018 | Nepomniachtchi | G06V 30/166 |
| 2019/0236348 A1* | 8/2019 | Miao | G07D 7/206 |
| 2019/0278986 A1* | 9/2019 | Nepomniachtchi | H04N 1/00734 |
| 2020/0304650 A1* | 9/2020 | Roach | G06Q 20/3276 |
| 2020/0311407 A1* | 10/2020 | Nepomniachtchi | G06V 30/412 |
| 2020/0334456 A1* | 10/2020 | Sridharan | G06K 9/6269 |
| 2021/0034895 A1* | 2/2021 | John Archibald | G06K 9/6232 |
| 2021/0049401 A1* | 2/2021 | Jean | G06F 16/5846 |
| 2022/0044055 A1* | 2/2022 | Jean | G06V 10/50 |

OTHER PUBLICATIONS

Viet et al., "A Robust End-To-End Information Extraction System for Vietnamese Identity Cards," 2019 6th NAFOSTED Conference on Information and Computer Science (NICS), 2019, pp. 483-488, doi: 10.1109/NICS48868.2019.9023853. (Year: 2019).*
Yang et al., "Image copy-move forgery detection based on sped-up robust features descriptor and adaptive minimal-maximal suppression," J. Electron. Imag. 24(6) 063016 (Dec. 14, 2015) (Year: 2015).*
Dang et al., "SSKSRIF: Scale and Rotation Invariant Features Based on Spatial Space of Keypoints for Camera-Based Information Spotting," 2018 International Conference on Content-Based Multimedia Indexing (CBMI), 2018, pp. 1-6, doi: 10.1109/CBMI.2018.8516532. (Year: 2018).*
Moisan et al., "Automatic homographic registration ofa pairof images, with a contrario elimination of outliers." Image Processing On Line 2 (2012): 56-73. (Year: 2012).*

EU. General data protection regulation. [Online]. Available: https://eur-lex.europa.eu/legal-content/EN/TXT/?uri=CELEX:32016R0679.
X. Hartl, C. Arth, and D. Schmalstieg, "Real-time detection and recognition of machine-readable zones with mobile devices." in VISAPP (3), 2015, pp. 79-87.
RF. Federal law of Jul. 27, 2006 n 152-fz on personal data. [Online]. Available: https://pd.rkn.gov.ru/authority/p146/p164/.
S. Long, X. He, and C. Ya, "Scene text detection and recognition: The deep learning era," arXiv preprint arXiv: 1811.04256, 2018.
A. Zhukovsky, D. Nikolaev, V. Arlazarov, V. Postnikov, D. Polevoy, N. Skoryukina, T. Chernov, J. Shemiakina, A. Mukovozov, I. Konovalenko et al., "Segments graph-based approach for document capture in a smartphone video stream," in 2017 14th IAPR International Conference on Document Analysis and Recognition (ICDAR), vol. 1. IEEE, 2017, pp. 337-342.
N. Skoryukina, D. P. Nikolaev, A. Sheshkus, and D. Polevoy, "Real time rectangular document detection on mobile devices," in Seventh International Conference on Machine Vision (ICMV 2014), vol. 9445. International Society for Optics and Photonics, 2015, p. 94452A.
A. M. Awal, N. Ghanmi, R. Sicre, and T. Furon, "Complex document classification and localization application on dentity document images," in 2017 14th IAPR International Conference on Document Analysis and Recognition (ICDAR), vol. 1. IEEE, 2017, pp. 426-431.
A. W. Harley, A. Ufkes, and K. G. Derpanis, "Evaluation of deep convolutional nets for document image classification and retrieval," in 2015 13th International Conference on Document Analysis and Recognition (ICDAR). IEEE, 2015, pp. 991-995.
Y. Xiao and K. Cho, "Efficient character-level document classification by combining convolution and recurrent layers," arXiv preprint arXiv: 1602.00367, 2016.
D. G. Lowe, "Object recognition from local scale-invariant features," in ICCV. IEEE, 1999, p. 1150.
M. Simon, E. Rodner, and J. Denzler, "Fine-grained classification of identity document types with only one example," in 2015 14th IAPR International Conference on Machine Vision Applications (MVA). IEEE, 2015, pp. 126-129.
J. Li, Z.-G. Fan, Y. Wu, and N. Le, "Document image retrieval with local feature sequences," in 2009 10th International Conference on Document Analysis and Recognition. IEEE, 2009, pp. 346-350.
P. Turcot and D. G. Lowe, "Better matching with fewer features: The selection of useful features in large database recognition problems," in 2009 IEEE 12th International Conference on Computer Vision Workshops, ICCV Workshops. IEEE, 2009, pp. 2109-2116.
O. Augereau, N. Journet, and J.-P. Domenger, "Semistructured document image matching and recognition," in Document Recognition and Retrieval XX, vol. 8658. International Society for Optics and Photonics, 2013, p. 865804.
N. Skoryukina, J. Shemiakina, V. L. Arlazarov, and I. Faradjev, "Document localization algorithms based on feature points and straight lines," in Tenth International Conference on Machine Vision (ICMV 2017), vol. 10696. International Society for Optics and Photonics, 2018, p. 106961H.
V. Bessmeltsev, E. Bulushev, and N. Goloshevsky, "Highspeed OCR algorithm for portable passport readers," 21st International Conference on Computer Graphics and Vision, GraphiCon'2011—Conference Proceedings, Jan. 2011.
M. Suk and B. Prabhakaran, "Real-time mobile facial expression recognition system—a case study," in 2014 IEEE Conference on Computer Vision and Pattern Recognition Workshops, Jun. 2014, pp. 132-137.
L. Juan and O. Gwun, "A comparison of SIFT, PCA-SIFT and SURF," IJIP, vol. 3, No. 4, pp. 143-152, 2009.
C. Cobarzan, M. A. Hudelist, K. Schoeffmann, and M. J. Primus, "Mobile image analysis: android vs. IOS," in International Conference on Multimedia Modeling. Springer, 2015, pp. 99-110.
Y. Takezawa, M. Hasegawa, and S. Tabbone, "Robust perspective rectification of camera-captured document mages," in 2017 14th IAPR International Conference on Document Analysis and Recognition (ICDAR), vol. 6. IEEE, 2017, pp. 27-32.

(56) References Cited

OTHER PUBLICATIONS

A. Lukoyanov, D. Nikolaev, and I. Konovalenko, "Modification of YAPE keypoint detection algorithm for wide local contrast range images," in Tenth International Conference on Machine Vision (ICMV 2017), vol. 10696. International Society for Optics and Photonics, 2018, p. 1069616.

B. Fan, Q. Kong, T. Trzcinski, Z. Wang, C. Pan, and P. Fua, "Receptive fields selection for binary feature description," IEEE Transactions on Image Processing, vol. 23, No. 6, pp. 2583-2595, 2014.

M. Muja and D. G. Lowe, "Fast matching of binary features," in 2012 Ninth conference on computer and robot vision. IEEE, 2012, pp. 404-410.

J. Matas, C. Galambos, and J. Kittler, "Robust detection of lines using the progressive probabilistic hough transform," Computer Vision and Image Understanding, vol. 78, No. 1, pp. 119-137, 2000.

V. V. Arlazarov, K. Bulatov, T. Chernov, and V. L. Arlazarov, "MIDV-500: A dataset for identity documents analysis and recognition on mobile devices in video stream," arXiv preprint arXiv:1807.05786, 2018.

Scanned images and photo added. [Online], Available: ftp://smartengines.com/midv-500.

\* cited by examiner

EFFICIENT LOCATION AND IDENTIFICATION OF DOCUMENTS IN IMAGES

CROSS-REFERENCE TO RELATED APPLICATIONS

The present application claims priority to Russian Patent App. No. 2020129039, filed on Sep. 2, 2020, which is hereby incorporated herein by reference as if set forth in full.

BACKGROUND

Field of the Invention

The embodiments described herein are generally directed to image recognition, and, more particularly, to an efficient means for locating and identifying the type of document in an image.

Description of the Related Art

In the modern world, various organizations require the constant transmission and verification of personal data. For example, government agencies may require personal data of an individual in order to check and receive payment for taxes and fines owed by the individual, process applications by the individual for government services, verify the identity of the individual as he or she passes through a security point, and/or the like. Similarly, private companies may require personal data of an individual in order to reserve transportation tickets (e.g., on an airline or railway) and hotel accommodations, process applications by the individual for private services (e.g., insurance, loans, etc.), and/or the like.

Automated document-recognition systems can be used to expedite document processing and reduce the risk of document fraud (e.g., identity fraud, forgery of documents, etc.). However, it would be especially advantageous if such systems could be adapted for use on mobile devices. Mobile devices are a less expensive, faster, and more convenient alternative to the bulky specialized hardware scanners that are typically required for document-based acquisition of personal data (e.g., from identity documents).

In addition, the incorporation of automated document recognition within mobile devices would enable personal-data acquisition to be integrated into larger services intended for consumption by end users. However, in many applications, the functionality of the automated document recognition would have to be provided even in conditions of limited connectivity (e.g., when the mobile device does not have a network connection). Furthermore, in some jurisdictions, regulatory restrictions may prohibit or restrict the storage and transmission of personal data. For example, the law of the Russian Federation requires personal data of citizens to be stored and processed on systems located in the Russian territory, and restricts the simultaneous transmission of personal and biometric data. Thus, it would be advantageous for the automated document recognition to be performed directly on the mobile device, such that no network connection or transmission is required.

SUMMARY

Accordingly, systems, methods, and non-transitory computer-readable media are disclosed for efficient recognition of the position and classification of documents in images. The disclosed techniques may be particularly suited for situations in which there is limited resources, such as a mobile device with limited processing and/or memory resources, no network connection a weak, slow, or low-bandwidth connection, or an otherwise limited connection network, and/or the like.

In an embodiment, a method is disclosed that comprises using at least one hardware processor to: receive an input image; extract one or more lines from the input image; extract at least one quadrangle from the input image based on the one or more lines; determine one or more parameters based on the at least one quadrangle; extract a plurality of input keypoints from the input image based on the one or more parameters; calculate an input descriptor for each of the plurality of keypoints; match the plurality of input keypoints to a plurality of reference keypoints in a reference database, based on the input descriptor calculated for each of the plurality of input keypoints, to identify one or more classification candidates, wherein each of the one or more classification candidates represents a template image of a type of document; determine the type of document in the input image and one or more distortion parameters for the document based on the one or more classification candidates; and output the determined type of document and one or more distortion parameters. The one or more distortion parameters may comprise a homography matrix.

The reference database may comprise a plurality of sets of reference keypoints and descriptors, wherein each of the plurality of sets represents one of a plurality of template images, and wherein each of the plurality of template images represents one of a plurality of types of document. At least one of the plurality of template images may be represented by at least four sets of reference keypoints and descriptors in the reference database, wherein each of the four sets represents one of the plurality of types of document rotated by a different amount of rotation than all others of the four sets. The different amounts of rotation for the four sets may comprise 0°, 90°, 180°, and 270°.

The method may further comprise, for each of the plurality of types of document: receiving the template image representing that type of document; extracting a plurality of reference keypoints from the template image; calculating a reference descriptor for each of the plurality of reference keypoints; and storing a compact representation of the template image in the reference database, wherein the compact representation comprises the plurality of reference keypoints and the reference descriptors calculated for the plurality of reference keypoints. Each reference descriptor may be stored in a hierarchical clustering tree. Extracting a plurality of reference keypoints from the template image may comprise excluding any keypoints that are within a region of the template image that has been identified as representing a field of variable data. Extracting a plurality of reference keypoints from the template image may comprise selecting the plurality of reference keypoints by: calculating a score for a plurality of candidate keypoints using a Yet Another Contrast-Invariant Point Extractor (YACIPE) algorithm; and selecting a subset of the plurality of candidate keypoints with highest scores as the plurality of reference keypoints. Calculating a reference descriptor for each of the plurality of reference keypoints may comprise calculating a receptive field descriptor for an image region around the reference keypoint. Each reference descriptor may comprise a vector of binary features.

The method may further comprise extracting data from the input image based on the determined type of document and the one or more distortion parameters. The extracted data may comprise one or more of text, an image, or a table.

The one or more classification candidates may comprise a plurality of classification candidates, and the method may further comprise using the at least one hardware processor to: calculate a rank for each of the plurality of classification candidates; and select one of the plurality of classification candidates based on the calculated ranks, wherein determining the type of document in the input image comprises identifying a type of document associated with the selected classification candidate. Selecting one of the plurality of classification candidates may comprise: selecting a subset of the plurality of classification candidates that have highest calculated ranks; performing a geometric validation with at least one of the classification candidates in the selected subset to identify the classification candidate as valid or invalid; and selecting one of the classification candidates, having a maximum calculated rank, from the classification candidates in the selected subset that are identified as valid. The geometric validation with each of the one or more classification candidates may comprise: calculating a transformation matrix that maps input keypoints in the input image to reference keypoints in the template image represented by the classification candidate; when the mapping is within a predefined accuracy, determining that the transformation matrix is valid; and, when the mapping is not within the predefined accuracy, determining that the transformation matrix is invalid. The transformation matrix may be a Random Sample Consensus (RANSAC) transformation matrix. For each of the one or more classification candidates, the transformation matrix may transform vertices of the at least one quadrangle to corners of the template image represented by the classification candidate. For each of the one or more classification candidates, the transformation matrix may be constrained by one or both of the following: a distance between any two reference keypoints is greater than a minimum distance threshold; or the at least one quadrangle is convex and no vertices of the at least one quadrangle lie outside the input image by more than a maximum distance threshold.

Extracting one or more lines from the input image may comprise applying a Hough transform to transform at least a portion of the input image into a Hough parameter space. Extracting one or more lines from the input image may comprise, for each of a plurality of regions of interest in the input image, calculating a grayscale boundaries map, and, iteratively until a predefined number of candidate lines are identified, applying a Fast Hough Transform to the boundaries map to produce a Hough parameter space, identifying a candidate line with a highest value in the Hough parameter space, and, if a number of identified candidate lines is less than the predefined number of candidate lines, erasing boundaries in a neighborhood of the identified candidate line with the highest value in the Hough parameter space. Extracting at least one quadrangle from the input image may comprise generating a plurality of candidate quadrangles using pairwise intersection of the identified candidate lines across at least two of the plurality of regions of interest, for each of the plurality of candidate quadrangles, calculating a weight for the candidate quadrangle based on weights associated with constituent lines of the candidate quadrangle, and selecting the at least one quadrangle from the plurality of candidate quadrangles based on the calculated weights for the plurality of candidate quadrangles. The one or more lines may comprise a plurality of lines, wherein extracting at least one quadrangle from the input image comprises: classifying each of the plurality of lines as either mostly horizontal or mostly vertical; generating an intersections graph based on the classifications of the plurality of lines, wherein each vertex in the intersections graph represents one of the plurality of lines, and wherein each edge in the intersections graph represents an intersection point of two of the plurality of lines; tagging each edge in the intersections graph with a corner type that corresponds to the represented intersection point; identifying one or more cycles in the intersections graph, wherein each cycle comprises four edges that are all tagged with different corner types; and selecting one of the one or more cycles as the at least one quadrangle based on a weighting.

The one or more parameters may comprise one or both of a scale and a rotation angle of the at least one quadrangle. Extracting the at least one quadrangle may comprise determining a weight for each of one or more candidate quadrangles extracted from the input image based on the one or more lines, and identifying one of the one or more candidate quadrangles with a highest weight as the at least one quadrangle. Determining one or more parameters based on the at least one quadrangle may comprise when the weight for the at least one quadrangle is greater than a predefined threshold, using a scale and rotation angle of the at least one quadrangle as the scale and the rotation angle in the one or more parameters, and, when the weight is less than the predefined threshold, using a default value for the scale in the one or more parameters, and determining the rotation angle in the one or more parameters by sorting constituent lines of the one or more candidate quadrangles that comply with geometric restrictions by an angle between each constituent line and a reference line, identifying a single constituent line for which an angular window includes a maximum number of constituent lines, and using the angle between the identified constituent line and the reference line as the rotation angle in the one or more parameters.

Any of the methods may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for efficient recognition of documents in images. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
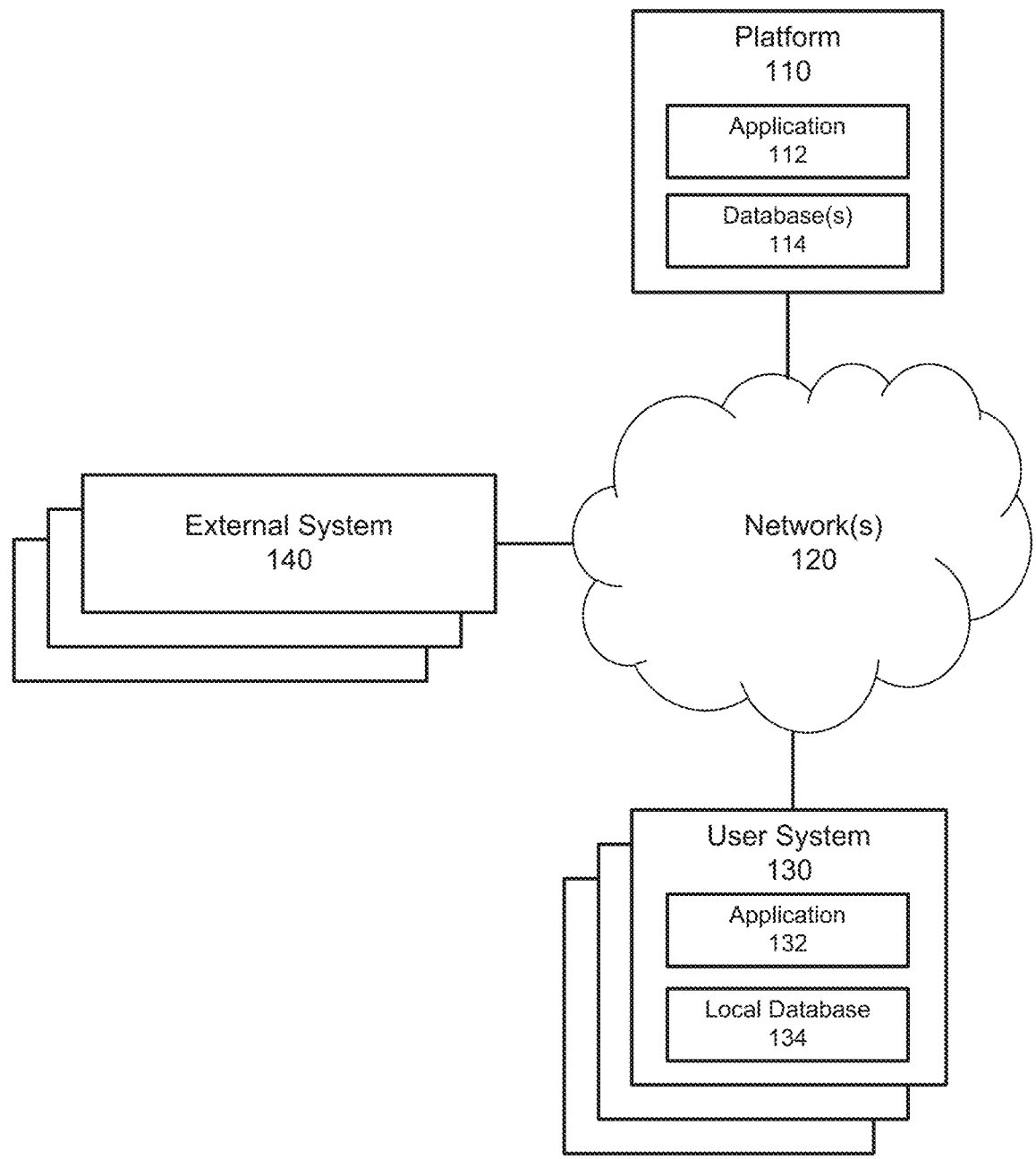
FIG. 1 illustrates an example infrastructure in which one or more of the processes described herein may be implemented, according to an embodiment.

FIG. 1 illustrates an example infrastructure in which one or more of the processes described herein may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smartphones or other mobile devices, servers, game consoles, televisions, set-top boxes, electronic kiosks, point-of-sale terminals, Automated Teller Machines, and/or the like. In a primary client-side embodiment, described herein, it is contemplated that user system 130 would normally comprise a smartphone, tablet computer, or other mobile device, whereas in a primary server-side embodiment, described herein, it is contemplated that user system 130 would normally comprise a smartphone, an image scanner, a desktop or laptop computer connected to an image scanner, or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™ IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, client application 132 executing on one or more user system(s) 130 may interact with server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application is a browser application, which simply requests, receives, and renders webpages at user system(s) 130, while the server application on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules that implement one or more of the functions, processes, or methods of the application described herein.

1.2. Example Processing Device

Figure 2:
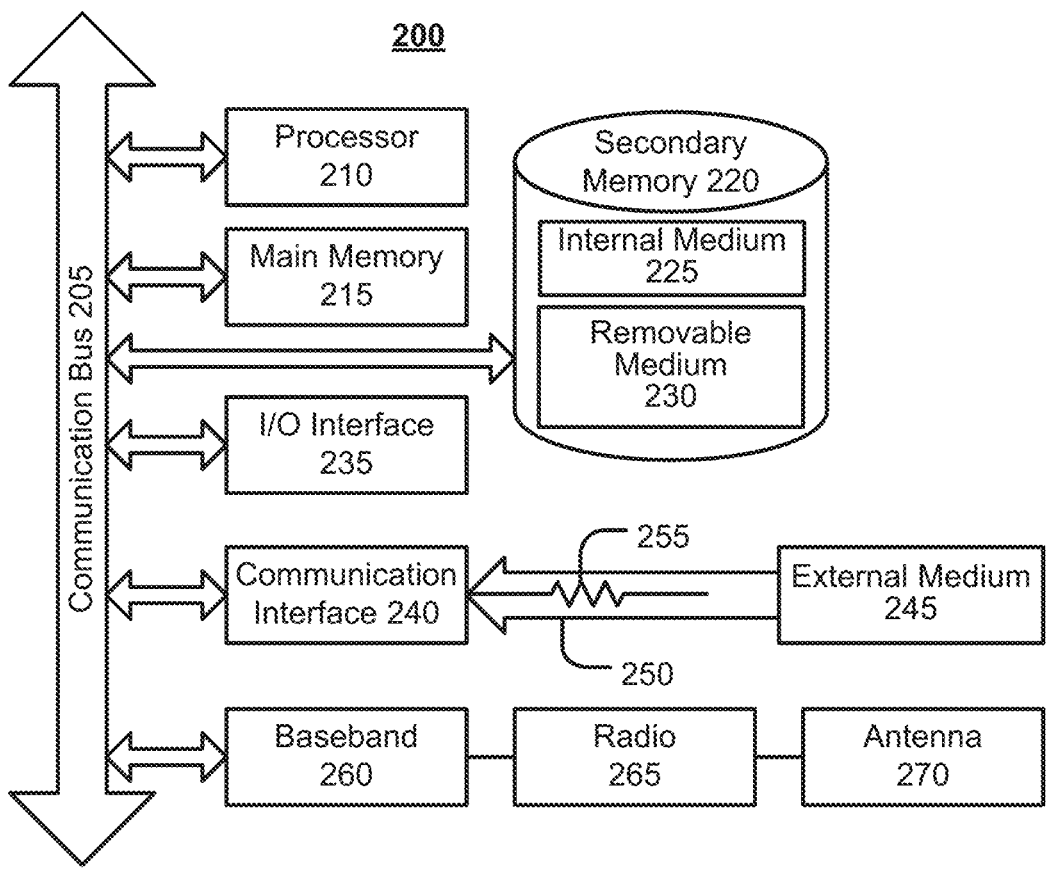
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

In an embodiment, I/O interface 235 provides an interface to a camera (not shown), for example, system 200 may be a mobile device, such as a smartphone, tablet computer, or laptop computer, with one or more integrated cameras (e.g., rear and front facing cameras). Alternatively, system 200 may be a desktop or other computing device that is connected via I/O interface 235 to an external camera. In either case, the camera captures images (e.g., photographs, video, etc.) for processing by processor(s) 210 (e.g., executing the disclosed software) and/or storage in main memory 215 and/or secondary memory 220.

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

1.3. Exemplary Systems

Embodiments in which document recognition is performed by user system 130 may be referred to as "client-side" embodiments, whereas embodiments in which document recognition is performed by platform 110 may be referred to as "server-side" embodiments. In an alternative embodiment, the document-recognition process could itself be split between user system 130 and platform 110, with some functions of the document-recognition process performed by user system 130 and some functions of the document-recognition process performed by platform 110. In any case, the disclosed document-recognition process may be performed by a document-recognition module that is implemented as one or more executable software modules. In an embodiment, the document-recognition process comprises both determining the location or position of a document in an input image and classifying the document into a particular type of document (e.g., a particular type of identity document). This is what is meant by the terms "location" and "classification," as used herein.

In the client-side embodiment, the document-recognition module is hosted and executed on a user system 130 (e.g., as client application 132). In this case, user system 130 may comprise system 200. The document-recognition module may be stored persistently in secondary memory 220, and loaded into main memory 215 to be executed by processor(s) 210 of user system 130. Updates of the document-recognition module may be automatically or manually downloaded from platform 110, periodically or as needed, when user system 130 has a connection to platform 110 via network(s) 120. Alternatively, the document-recognition module may be updated by other means or not at all. In either case, user system 130 may be a mobile device, such as a smartphone, laptop computer, or tablet computer, with an integral or connected camera or dedicated image scanner. For example, in a typical client-side embodiment, an input image of a document may be captured using a camera of the mobile device, with the document recognition performed directly by one or more processors 210 on the mobile device.

Preferably, the time required to perform document recognition in the client-side embodiment should not exceed one second. See, e.g., "High-speed OCR algorithm for portable passport readers," Bessmeltsev et al., 21st Int'l Conference on Computer Graphics and Vision, GraphiCon '2011—Conference Proceedings, 2011, which is hereby incorporated herein by reference as if set forth in full. Mobile recognition systems are considered "real-time" if they have processing rates of more than two frames per second. See, e.g., "Real-Time Mobile Facial Expression Recognition System—A Case Study," Suk et al., 2014 IEEE Conference on Computer Vision and Pattern Recognition Workshops, pp. 132-7, June 2014, which is hereby incorporate herein by reference as if set forth in full. Thus, in a preferred implementation, the client-side embodiment would be able to recognize the document in an image in under half a second.

In the alternative, server-side embodiment, the document-recognition module is hosted and executed on platform 110 (e.g., as server application 112). In this case, platform 110 may comprise system 200 as a server system. Again, the document-recognition module may be stored persistently in secondary memory 220, and loaded into main memory 215 to be executed by processor(s) 210 of platform 110. Images may be uploaded from user system(s) 130, through network(s) 120, to platform 110 for processing by the document-recognition module. For example, in a typical server-side embodiment, an input image that has been captured at a user system 130 (e.g., scanned, photographed, or otherwise sensed) is transmitted to remote platform 110 for analysis.

Preferably, the time required to perform document recognition in the server-side embodiment should not exceed the time required to scan the document. Modern sheet-fed scanners have processing rates ranging from 20-30 pages per minute for lightweight models (e.g., Canon™ imageFORMULA DR-C, Kodak™ ii, etc.) to 200 or more pages per minute for heavy-duty models (e.g., Canon™ imageFORMULA DR-G, Kodak™ Alaris i5 series, etc.), with an average processing rate of 60 pages per minute.

An example of input characteristics and requirements for the client-side and server-side embodiments, described above, is illustrated in Table 1 below:

TABLE 1

| | Client-side Embodiment | Server-side Embodiment |
| --- | --- | --- |
| Input Image | Image frame from video | Photograph captured by mobile device or scanner |
| Document Position | All document boundaries are visible in input image | Up to two boundaries may be absent from input image (e.g., when document is positioned in a corner of the input image) |
| No. of Pixels/ Pixel Density | 0.5-8.0 megapixels (e.g., Ultra High Definition 4K) | scan of 150-600 pixels per inch, or photograph of 2.0-15.0 megapixels |
| Minimum Character Height | 10 pixels | 10 pixels |
| Processing Time Limit | 0.5 seconds (benchmark: Exynos™ 7420, Apple™ A8) | 1 second (benchmark: AMD™ FX-8350, Intel™ Core i7 4470S) |

It should be understood that the example requirements in Table 1 are non-limiting. In other words, other characteristics and requirements are possible, and the above characteristics and requirements simply represent typical objectives. Thus, Table 1 is merely used as an example of parameters that the disclosed document-recognition module is capable of satisfying.

In addition, in client-side embodiments in which the document-recognition module is part of a larger application, other functions of the larger application may be performed client-side and/or server-side. Similarly, in server-side embodiments in which the document-recognition module is part of a larger application, other functions of larger application may be performed server-side and/or client-side. As one example of a client-side embodiment, the document-recognition module may be executed client-side on user system 130 (e.g., a mobile device, such as a smartphone), whereas other modules, representing the remainder or other portion of the application, may be executed server-side on platform 110. In this case, the result of the document recognition or a result of additional processing based on the result of the document recognition, performed on user system 130, may be transmitted from user system 130 to platform 110 via network(s) 120. Then, an overall result of the application may be determined by platform 110, and transmitted from platform 110 to user system 130 and/or an external system 140 via network(s) 120.

Preferred embodiments of the document-recognition module are both scalable and trainable. For scalability, the document-recognition module should be capable of simultaneously supporting hundreds of different document types. For example, there are more than one hundred different templates of drivers licenses in the United States, since there are fifty states and each state has two or more templates. In an embodiment, the document-recognition module, whether client-side or server-side, is capable of recognizing all of these different document types (i.e., the particular template of the state which issued the drivers license in the image). Additionally or alternatively, the document-recognition module may be configured to identify other types of documents (e.g., other identity documents, such as passports, employee identification cards, etc., and/or other non-identity documents).

For trainability, the document-recognition module should not require a large training dataset. This is particularly true for a document-recognition module that is intended to recognize identity documents (e.g., drivers licenses, passports, etc.), since samples of identity documents are generally not published or otherwise openly available in large numbers due to legal restrictions and security concerns.

2. Process Overview

Embodiments of processes for efficient recognition of documents in images will now be described in detail. It should be understood that the described processes may be embodied in one or more software modules that are executed by one or more hardware processors (e.g., processor 210), for example, as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described processes may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps, each process may be implemented with fewer, more, or different steps and a different arrangement and/or ordering of steps. In addition, it should be understood that any step, which does not depend on the completion of another step, may be executed before, after, or in parallel with that other independent step, even if the steps are described or illustrated in a particular order.

2.1. Introduction

Figure 3:
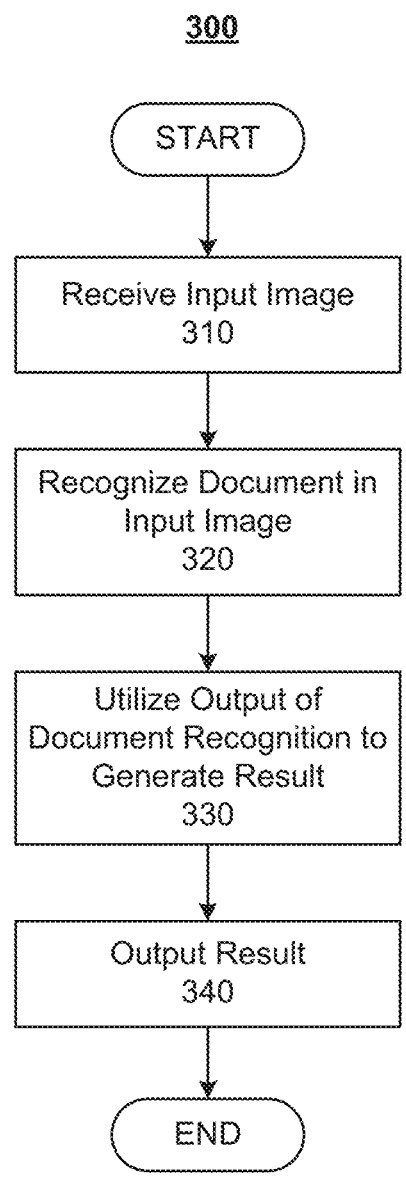
FIG. 3 illustrates a process in which document recognition is performed, according to an embodiment.

FIG. 3 illustrates a process 300 in which document recognition is performed, according to an embodiment. Process 300 may be performed client-side by user system 130 (e.g., as client application 132 executing on a mobile device) or server-side by platform 110 (e.g., as server application 112). Alternatively, process 300 may be a distributed process with some subprocesses, such as subprocesses 310 and 320, being performed client-side by user system 130 and other subprocesses, such as subprocesses 330 and 340, being performed server-side by platform 110. It should be understood that subprocess 320 represents the disclosed document-recognition process, which may be implemented by the document-recognition module described herein, which may for part of the larger application that implements process 300. Alternatively, subprocess 320 could be a stand-alone process by itself or in combination with subprocess 310.

In subprocess 310, an input image is received. Subprocess 310 may comprise capturing the input image using a digital camera (e.g., a small-scale digital camera integrated into or connected to user system 130) or hardware scanner. In the case of a hardware scanner, the scanned input image may have a resolution between 150 pixels per inch (PPI) to 600 PPI or higher. In an alternative embodiment, subprocess 310 may comprise receiving a previously captured input image (e.g., captured earlier in time and/or by another device). In either case, the input image may comprise a stand-alone photograph or an image frame from a video stream.

In subprocess 320, a document, represented in the input image, is recognized, according to the document-recognition process described herein. During subprocess 320, the input image may also be pre-processed and/or post-processed. For example, once the document-recognition module identifies the location of the document in the input image, a portion of the input image that does not contain the document may be cropped out, such that little or no background remains in the output image. In general, the position (e.g., location and orientation) of the document in the input image, including the angular rotation of the document, could be arbitrary. In addition, an input image that has been captured by a camera of a mobile device may include highlights and other lighting variations, and the document in the input image may have projective distortions.

In subprocess 330, the output of the document recognition in subprocess 320 may be utilized in one or more additional subprocesses to produce a result that is output in subprocess 340. Subprocess 330 may utilize the position of the document and the type of the document, recognized in subprocess 320, to extract data from the image of the document. For example, this data extraction may comprise applying optical character recognition (OCR) to text fields within the boundaries of the located document in order to extract text from the document, extracting images within the boundaries of the document (e.g., headshots of a person identified by the document), decoding a barcode (e.g., one-dimensional barcode, matrix barcode, such as a Quick Response (QR) code, etc.) and/or other type of code within the boundaries of the document to produce corresponding character strings, and/or the like.

While the document recognition in subprocess 320 could be performed as a stand-alone function, it is most beneficial in the context of a larger process, such as process 300. Despite the widespread development of text-in-the-wild methods, as described, for example, in "Scene Text Detection and Recognition: The Deep Learning Era," Long et al., arXiv:1811.04256, 2018, which is hereby incorporated herein by reference as if set forth in full, it is more efficient, in terms of computational performance, to locate a document prior to text recognition (e.g., OCR). Thus, the disclosed process for detecting the precise coordinates of document boundaries in subprocess 320 can greatly benefit a text recognition process in an embodiment of subprocess 330.

In order to find the coordinates of the document's boundaries, it is generally sufficient to estimate the distortion parameters in the form of a homography matrix. In more specific cases, an affine transformation matrix or other matrix may be used. Notably, identity documents are sometimes characterized by text fields with fixed positions. Thus, knowledge of the type of document in the input image and the distortion parameters enables subprocess 330 to identify zones in the input image that represent text fields, without extra computation.

2.2. Document Recognition

In an embodiment, document recognition, which may correspond to subprocess 320 in FIG. 3, comprises identifying the position (e.g., location and/or orientation) of a document in an input image, identifying the type of document in the input image, and/or determining the projective distortion parameters for the document in the input image. The disclosed document-recognition process is universal in that it may be used for both client-side and server-side embodiments.

To start, "Complex Document Classification and Localization Application on Identity Document Images," Awal et al., 14th Int'l Association for Pattern Recognition (IAPR) Int'l Conference on Documents Analysis and Recognition (ICDAR), IEEE, vol. 1, pp. 426-31, 2017, which is hereby incorporated herein by reference as if set forth in full, describes a multitude of approaches for classifying documents. Of these, the methods based on visual document representation are the most suited for classifying identity documents into different types. Such methods include a number of neural-network based methods, as described in "Evaluation of Deep Convolutional Nets for Document Image Classification and Retrieval," Harley et al., 13th ICDAR, IEEE, pp. 991-5, 2015, and "Efficient Character-level Document Classification by Combining Convolution and Recurrent Layers," Xiao et al., arXiv:1602.00367, 2016, which are both hereby incorporated herein by reference as if set forth in full. However, high classification accuracy requires architectures with fully connected layers containing large amounts of weights, and this require large training datasets. As mentioned above, in the case of document recognition for identity documents, large training datasets of the size required for such neural networks are not generally available. Other methods include a combination of statistical learning with methods of data synthesis and augmentation.

However, there exists a classification approach that is based on pairwise image matching. In this approach, a compact representation is computed for images of documents, which is robust against certain distortions. A compact representation of an image that uses a set of keypoints and descriptors associated with those keypoints has advantages over representations that use global descriptors or a set of local descriptors without spatial information (referred to as a "bag of local features"). An example of a representation that uses a set of keypoints and associated descriptors is described in "Object Recognition from Local Scale-Invariant Features," Lowe, Int'l Conference on Computer Vision (ICCV), IEEE, p. 1150, 1999, which is hereby incorporated herein by reference as if set forth in full. An example of a representation that uses global descriptors is described in "Fine-grained classification of identity document types with only one example," Rodner et al., 14th IAPR Int'l Conference on Machine Vision Applications (MVA), IEEE, pp. 126-9, 2015, which is hereby incorporated herein by reference as if set forth in full. An example of a representation that uses a set of local descriptors without spatial information is described in "Document Image Retrieval with Local Feature Sequences," Li et al., 10th ICDAR," IEEE, pp. 346-50, 2009, which is hereby incorporated herein by reference as if set forth in full.

Due to its advantages over other methods, an embodiment of the disclosed document-recognition process utilizes keypoints and associated descriptors to represent documents in images. This pairwise set of keypoints and associated descriptors may also be referred to as a "constellation of features." The constellation of features for an image comprises a set of local features and information about those local features' mutual spatial relationships. This constellation-of-features model is more robust against inter-class collisions than the bag-of-local-features model. However, the general mapping of the constellation of features to a metric space is not trivial to define, thereby restricting the usage of data structures for fast nearest-neighbor searches.

"Better matching with fewer features: The selection of useful features in large database recognition problems," Turcot et al., 12th ICCV Workshops, IEEE, pp. 2109-16, 2009, which is hereby incorporated herein by reference as if set forth in full, describes a two-step scheme that combines the advantages of the constellation-of-features model with the bag-of-local-features model. In the first step, an approximate nearest-neighbor search is performed in a reference database using the bag-of-local-features model. In the second step, the geometric correspondence between the input image and each of the candidates selected in the first step is estimated. This two-step scheme has high classification accuracy for identity documents in scanned input images and in mixed datasets.

"Semi-structured document image matching and recognition," Augereau et al., Document Recognition and Retrieval XX, vol. 8658, Int'l Society for Optics and Photonics, p. 865804, 2013, which is hereby incorporated herein by reference as if set forth in full, illustrates that filtering the false correspondences of local features and checking that the obtained solution is well-conditioned dramatically increases classification accuracy. This filtering requires several samples of each document type.

Awal et al. describes a generalization of this approach that allows for projective distortion of the document in the input image. Awal et al. also features a filtering method based on a single sample of each document type. This filtering method comprises identifying areas in the sample image that contain variable data, and excluding features extracted from those areas.

The authors of both Augereau et al. and Awal et al. exclusively considered the classification accuracy of their algorithms. However, in addition to classifying a document, the disclosed document-recognition module may determine the position of a document's boundaries. Furthermore, the speed and accuracy of the disclosed approach can be further improved by combining it with methods for detecting geometric primitives, such as lines and quadrangles, as described, for example, in "Document localization algorithms based on feature points and straight lines," Skoryukina et al., 10th Int'l Conference on Machine Vision (ICMV), Int'l Society for Optics and Photonics, vol. 10696, p. 106961H, 2018, which is hereby incorporated herein by reference as if set forth in full.

The determination of the type of the document in an input image and the determination of the distortion parameters of that document can be performed independently from each other or within a single process. The document in an input image may be located using methods for extracting boundary elements, segments, and/or lines. A quadrangle may then be constructed using these detected geometric primitives by traversing the intersections graph, as discussed, for example, in "Segments Graph-Based Approach for Document Capture in a Smartphone Video Stream," Zhukovsky et al., 14th IAPR Int'l Conference on Document Analysis and Recognition, IEEE, vol. 1, pp. 337-342, 2017, which is hereby incorporated herein by reference as if set forth in full, or by searching through alternatives using a system of penalties and heuristic pruning in various stages, as discussed, for example, in "Real time rectangular document detection on mobile devices," Skoryukina et al., 7th Int'l Conference on Machine Vision, Int'l Society for Optics and Photonics, vol. 9445, p. 94452A, 2015, which is hereby incorporated herein by reference as if set forth in full.

Image classes (i.e., representing different types of documents) may be defined for N document types as follows:

$$C = \{C_i\}_{i \in [0,N]},$$

wherein $C_i$ is the class of images with the i-th document type for $i \in [1, N]$. Class Co may be defined as a class of other images (e.g., for images that cannot be classified as another document type).

The goal of document recognition is to determine the class $C_i$ for a given query or input image Q. For each class $C_i$, $i \in [1, N]$, a template image $T_i$, representing an ideal image of a document, is obtained. An ideal image of a document is an image in which the document has been captured under ideal circumstances, including ideal lighting (e.g., uniform lighting, no bright spots, proper exposure etc.), in focus (e.g., high contrast, etc.), no distortions (e.g., no warping, no skew, etc.), and nothing obscuring the document. At the very least, each template image T should be generated from an ideal image of a document that has been captured in uniform lighting conditions without projective distortions. For example, the ideal images to be used as template images T may be obtained by using a flatbed scanner to capture an image of a document, which represents the prototype for a particular class or type of document, and then cropping the captured image to the boundaries of the document to remove any background.

If the determined class $C_i$ is associated with a template image $T_i$, the transformation $H:Q \rightarrow T_i$ can be estimated to map points in the input image Q to corresponding points in the template image $T_i$. To estimate this transformation, a family of projective transformations may be used. The projective transformations, as described by a pinhole camera, may be expressed as a 3×3 matrix operator.

In an embodiment, the document-recognition module uses the Speeded-Up Robust Features (SURF) algorithm, as described in Awal et al., to select the centers of informative regions (i.e., keypoints) in the input image Q and in each template image $T_i$. The neighborhoods of these keypoints are encoded using local metric descriptors. Each keypoint p and its descriptor f in the input image Q is matched with keypoints, from template images $T_i$, whose descriptors are closest to the point p's descriptor f in terms of the Euclidean metric (also referred to as "Euclidean distance"). To speed up the matching process, the keypoints and descriptors of the template images $T_i$ in the reference database may be indexed. Specifically, for each template image $T_i$, each keypoint p with its associated descriptor f may be placed in a hierarchical clustering tree or randomized k-d tree.

Each template image $T_i$, having keypoints matching the keypoints in input image Q, may be assigned a rank r. Rank r may be calculated as the number of keypoints, classified as neighbors of descriptor f, divided by the total number of keypoints in the template image $T_i$. However, alternatives methods may be used to calculate the rank r for each template image $T_i$.

Geometric validations may be performed for those template images $T_i$ with the highest rank r. This geometric validation may comprise, for each template image $T_i$ that is a candidate to match input image Q, calculating a Random Sample Consensus (RANSAC) transformation matrix that maps keypoints in input image Q to keypoints in the template image $T_i$. A pair of keypoints with close descriptors is considered to be a geometrically valid match if the RANSAC transformation matrix maps the pair of keypoints to each other within a predefined accuracy threshold. In the context of documents, the transformation will be considered geometrically valid if the corners of the documents in the images define a quadrangle that complies with a set of predefined conditions.

One template image T may be selected, from the set of possible candidates, based on the ranking and geometric validation of all of the template images T in the set of possible candidates. For example, the template image T with the highest number of matching keypoints with geometrically valid transformations may be selected. The document type associated with selected template image Tis then identified as the document type of the document in input image Q.

The above combination of the constellation-of-features model with approximate nearest-neighbor searches has demonstrated high accuracy when applied to document classification. However, there are a number of problems with this approach:

For some types of identity documents, the positioning or structure of static elements does not allow a well-conditioned transformation matrix H to be constructed.

The differences in image sizes between input images Q may be up to 400% in some implementations of the server-side embodiment.

The SURF algorithm in Awal et al. determines the scale of input image Q before local feature extraction, but research on robustness demonstrates that the percentage of correctly matched input images with changing scale is than 50% or less. See, e.g., "A comparison of SIFT, PCA-SIFT and SURF," Juan et al., IJIP, vol. 3, no. 4, pp. 143-52, 2009, which is hereby incorporated herein by reference as if set forth in full.

The speed of this approach is generally not sufficient for mobile devices. For example, this approach cannot satisfy the requirements in Table 1 for the client-side embodiment. See, e.g., "Mobile Image Analysis: Android vs. iOS," Cobâszan et al., Int'l Conference on Multimedia Modeling, Springer, pp. 99-110, 2015, which is hereby incorporated herein by reference as if set forth in full.

The above approach utilizes "points" as local features. In an embodiment, the disclosed document recognition improves on this approach by utilizing document boundaries and content structures (e.g., photographs, tables, and/or the like in the document) to yield other types of local features, such as lines (e.g., full lines or line segments) and/or quadrangles. The extraction of these higher-level features enables the document-recognition module to compensate for projective distortions, with the possible exception of scale (see, e.g., "Robust Perspective Rectification of Camera-Captured Document Images," Takezawa et al., 14th IAPR ICDAR, IEEE, vol. 6, pp. 27-32, 2017, which is hereby incorporated herein by reference as if set forth in full) and 90° rotation.

In light of the problems discussed above, in an embodiment, the document-recognition module uses less informative keypoint detectors and descriptors in combination with fast methods of locating geometric primitives, such as lines and quadrangles. Once the geometric primitives are located, they may be used to obtain more relevant descriptor values and to validate the geometric correctness of the result.

Figure 4:
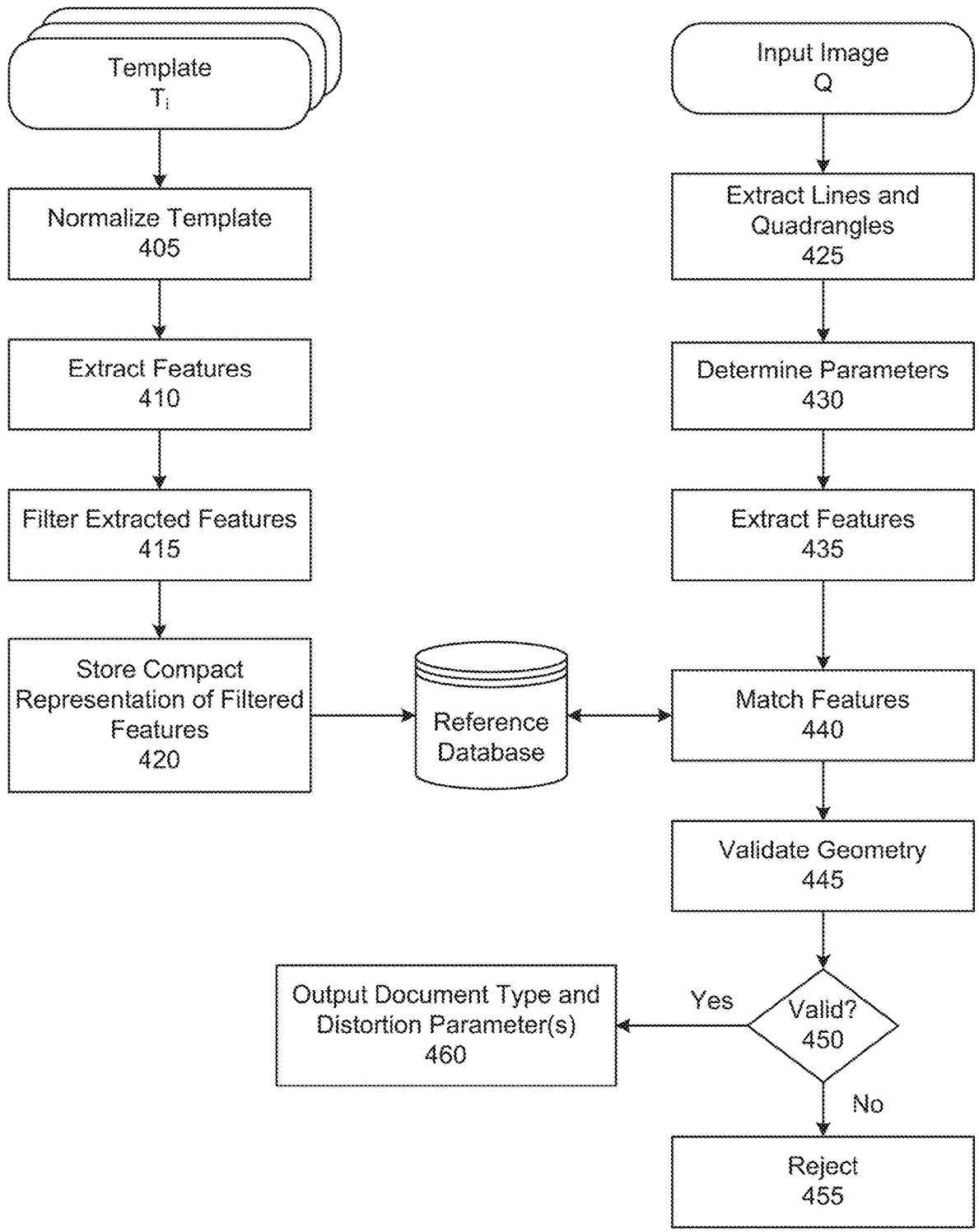
FIG. 4 illustrates a document-recognition process, according to an embodiment.

FIG. 4 illustrates a document-recognition process, according to an embodiment. In subprocesses 405-420, a plurality of template images $T_i$ are converted into compact representations that are stored in a reference database and, in subprocesses 425-460, which correspond to the disclosed document-recognition module, an input image Q is matched to the reference database to identify a document type and one or more distortion parameters for a document in the input image Q. It should be understood that subprocesses 405-420 may be performed serially or in parallel for each template image $T_i$, and subprocesses 425-460 may be performed serially or in parallel for each input image Q.

2.2.1. Processing of Template Images

In subprocess 405, template images $T_i$, representing ideal images of documents, are normalized. For each template image T, this normalization may comprise scaling the width of the template image T to a standard value with the same aspect ratio, and smoothing the template image T using an edge-preserving blur (e.g., bilateral filter). This normalizing pre-processing enhances keypoint detection, and simplifies scale estimation since images with the same aspect ratio will have the same size.

In subprocess 410, features (e.g., keypoints and descriptors) are extracted from each template image $T_i$. In an embodiment, the Yet Another Contrast-Invariant Point Extractor (YACIPE) algorithm is used for keypoint detection, due to its computational performance. However, it should be understood that other keypoint-detection algorithms may be used. The YACIPE algorithm is described, for example, in "Modification of YAPE keypoint detection algorithm for wide local contrast range images," Lukoyanov et al., 10th ICMV, Int'l Society for Optics and Photonics, vol. 10696, p. 1069616, 2018, which is hereby incorporated herein by reference as if set forth in full. The YACIPE algorithm represents each keypoint using coordinates and a score (e.g., ⟨x, y, YACIPE score⟩). The neighborhood size and orientation for each keypoint are not computed. For each keypoint, receptive field descriptors (RFDs) are calculated for an image region (e.g., a 32×32 pixel region) around the keypoint to produce a feature vector. This calculation is described, in an example, in "Receptive Fields Selection for Binary Feature Description," Fan et al., IEEE Transactions on Image Processing, vol. 23, no. 6, pp. 2583-95, 2014, which is hereby incorporated herein by reference as if set forth in full. In an embodiment, the resulting feature vector for each keypoint comprises 297 binary features. In the constellation-of-features model of an embodiment, an image I (e.g., an input image Q or template image T) can be represented as follows:

$$\omega = W(I) = \{ \langle p_i, f_i \rangle \}_{i \in [1,M]},$$

wherein $p_i = (x_i, y_i)$, representing the coordinates of the i-th keypoint in the image I, wherein $f_i$ is the descriptor of the neighborhood of the i-th keypoint in the image I, and wherein M is the number of keypoints detected in the represented image I.

In subprocess 415, the features extracted in subprocess 410 are filtered. In other words, some of the extracted features may be discarded. For example, as described in Awal et al., zones with variable data (e.g., text or images that will vary across different instances of documents of the same type) may be selected in each template image T. All keypoints in these zones of variable data in the template image T are discarded when calculating the compact representation of the template T, i.e., $\omega_i = W(T_i)$. Examples of such zones are depicted by the highlighted portions in the template image T in FIG. 5A. In an embodiment, the remaining keypoints are sorted in descending order of YACIPE score, and the M keypoints with the highest YACIPE scores are stored as the compact representation of the template image T in the reference database in subprocess 420 to be used for feature matching. In subprocess 420, the features in each compact representation may be stored in the reference database in an index tree (e.g., hierarchical clustering tree, a randomized k-d tree, etc.).

The RFDs are robust for angular rotation of up to 15°. In addition, the use of lines (e.g., full lines and line segments) in the image enables the document-recognition module to determine any angular position of a document, with the exception of a 90° rotation. Thus, to fully account for the classification of rotated documents, angular rotations of 0°, 90°, 180°, and 270° should be addressed. It is more computationally efficient to account for these rotations in subprocesses 405-420 for template images $T_i$, since these subprocesses can be performed offline. Accordingly, in an embodiment, a separate template image T may be obtained for each type of document at each of the 0°, 90°, 180°, and 270° rotations. Consequently, each template image T will have four compact representations stored in the reference database: a first compact representation of an ideal image of the document rotated at 0°, a second compact representation of the ideal image of the document rotated at 90°, a third compact representation of the ideal image of the document rotated at 180°, and a fourth compact representation of the ideal image of the document rotated at 270°. It should be understood that a match of an input image Q to any of these four compact representations in the reference database will result in a match to the same associated document type.

A trivial matching process for each descriptor in an input image Q to each descriptor of a template image T will lead to linear dependence on the number of template images $T_i$. Thus, in an embodiment, compact representations may be processed as described in "Fast Matching of Binary Features," Muja et al., 9th Conference on Computer and Robot Vision, IEEE, pp. 404-10, 2012, which is hereby incorporated herein by reference as if set forth in full. In particular, for each point $j \in [1, |\omega_i|]$ in each compact representation of an image, an entry $(i, f_j^i)$ is added into a data structure which enables a nearest neighbor search, such as a hierarchical clustering tree. Then, in order to expedite the matching process, the descriptor of each entry of the compact representation of the input image Q is searched in this data structure, and the list of its nearest neighbors is obtained from among the entries of the compact representations of the template images $T_i$. Based on the frequency of templates images $T_i$ having a neighboring entry to the entry of the input image Q, the list of template images $T_i$ may be pruned, thereby constraining the candidate template images $T_i$ during matching.

2.2.2. Matching of Input Images

In an embodiment, each input image Q is analyzed at least twice: (1) to locate lines and quadrangles; and (2) to perform keypoint analysis. The first analysis is represented by subprocess 425, whereas the second analysis is represented by subprocess 435.

The particular method used for locating lines and quadrangles may depend on the specifics of the document-recognition module, such as whether the document-recognition module is intended as a client-side or server-side embodiment. For example, the algorithm for fast quadrangle detection in Skoryukina et al. satisfies the example requirements of the client-side embodiment specified in Table 1, and therefore, may be used in an embodiment of subprocess 425. Restrictions on the size of the document in input image Q (e.g., an image frame) enable the algorithm to set regions of interest (ROIs) for each side of the document and perform detection of each side independently. Subprocess 425 may comprise calculating a grayscale boundaries map for each ROI, and subsequently performing the following procedure, iteratively, on each boundaries map:

(1) Apply the Fast Hough Transform to the boundaries map. The Hough Transform is described, for example, in "Point-to-line mappings as Hough Transforms," Bhattacharya et al., Pattern Recognition Letters, vol. 23, no. 14, pp. 1705-10, 2002, and U.S. Pat. No. 3,069,654, issued Dec. 18, 1962, which are both hereby incorporated herein by reference as if set forth in full.

(2) Identify the cell with the highest value in the Hough parameter space as defining the candidate line and its weight.

(3) If the number of obtained candidate lines is not sufficient, erase the boundaries in the boundaries map in the neighborhood of the candidate line, and perform another iteration of (1)-(3).

Subprocess 425 may generate a set of candidate quadrangles using pairwise intersection of lines across different ROIs. A weight may be assigned to each candidate quadrangle as a sum of the weights of its constituent lines. The weights of the candidate quadrangles may then be corrected by, for each candidate quadrangle, reconstructing the original prototype parallelogram, and estimating the discrepancy in relation to the document model, in terms of aspect ratio and angle values of the document corners.

While the above method satisfies the example requirements of the client-side embodiment in Table 1, it does not necessarily satisfy the example requirements of the server-side embodiment in Table 1. This is because the document in a scanned image can be arbitrarily positioned, which makes the definition of ROI for the document boundaries problematic. However, the more relaxed constraints on computational performance for the server-side embodiment enable the method described in Zhukovsky et al. to be employed for subprocess 425. Notably, this method can be used to analyze both scanned input images and images obtained using a camera (e.g., of a user system 130, such as a mobile device).

In this alternative embodiment, subprocess 425 comprises a two-step detection of line segments in the input image. In the first step, 8-connected contours are collected using a binary boundaries map, and linear segments are extracted. In the second step, additional linear segments are extracted. These additional linear segments are extracted by applying a Progressive Probabilistic Hough Transform to a grayscale boundaries map, as described, for example, in "Robust Detection of Lines Using the Progressive Probabilistic Hough Transform," Matas et al., Computer Vision and Image Understanding, vol. 78, no. 1, pp. 119-37, 2000, which is hereby incorporated herein by reference as if set forth in full.

Each of the extracted linear segments are classified as either mostly horizontal or mostly vertical. Based on the classifications of the extracted linear segments, the document-recognition module generates an intersections graph, in which each vertex corresponds to one of the linear segments and each edge corresponds to the intersection point of lines defined by two linear segments. If linear segments corresponding to adjacent vertices are orthogonally oriented, an edge is added to the intersections graph. Each intersection point may be tagged with the type of document corner (e.g., top-left, top-right, bottom-left, bottom-right, etc.) that corresponds to the intersection point. The intersections graph is transformed to a four-partite directed graph, in such a way that each edge, corresponding to an intersection point, corresponds to a single type of document corner. A cycle composed of four edges in the intersections graph represents a quadrangle in the input image. Thus, each four-edged cycle may be extracted as a candidate quadrangle. In addition, each extracted candidate quadrangle can be weighted in an analogous manner to the method described above.

Both of the alternative embodiments of subprocess 425, described above, result in a set of lines and a set of quadrangles, which may be described as follows:

lines: $\{l = \langle a,b,c \rangle : ax+by+c=0\}$ quadrangles: $\{q = \langle p_2, p_3, p_4 \rangle\}$ Subprocess 430 determines image-processing parameters prior to extraction of keypoints and the computation of associated descriptors. These parameters may comprise scale and angle, and may depend on the scores of lines and quadrangles found in subprocess 425. The following cases will be considered:

(1) At least one quadrangle was found, and the best quadrangle (i.e., greatest weight) is valid (i.e., accepted). A quadrangle may be determined to be valid when the weight of the quadrangle is greater than a predefined threshold.

(2) At least one quadrangle was found, but the best quadrangle is invalid (i.e., rejected). A quadrangle may be determined to be invalid when the weight of the quadrangle is less than the predefined threshold.

(3) No quadrangles were found, indicating that there was an insufficient number of lines found, or it is impossible to obtain a quadrangle from the lines using a projective transformation described by a pinhole camera.

In the first case, the best quadrangle can be used to determine the scale and rotation of the document in the input image. Specifically, the scale and rotation of this best quadrangle may be used as the scale and rotation parameters for subsequent subprocesses.

In the second case, it is unreasonable to "trust" the best quadrangle. Thus, in the second case, the best quadrangle may be used to determine rotation, but not scale. For example, all constituent lines of the candidate quadrangles that comply with the geometric restrictions may be selected. The selected lines may be sorted by the angle $\alpha$ between each selected line and the horizon (e.g., a horizontal reference line). Then, a single line, for which the maximum number of lines is enclosed in an angular window of size $\Delta\alpha$, is selected. In this case, angle $\alpha$ can be considered the rotation angle of the document, and used as the rotation parameter for subsequent subprocesses. A predefined default value may be used as the scale parameter.

In the third case, the acquired geometric characteristics do not allow a confident determination of one or both of the scale and rotation parameters. Thus, predefined default values may be used for both the scale and rotation parameters.

Figure 5A:
FIGS. 5A and 5B illustrate examples of template and input images in the context of document recognition, according to an embodiment.

In subprocess 435, features are extracted based on the parameters (e.g., scale and/or rotation angle) determined in subprocess 430. Subprocess 435 may be similar or identical to subprocess 410, or may be different than subprocess 410. Regardless of the particular implementation, subprocess 435 extracts keypoints from input image Q, with the size and orientation of local neighborhoods determined by the scale and rotation parameters provided by subprocess 430. FIG. 5A illustrates the extraction of keypoints in an example input image Q, as well as a template image T. For each keypoint p, the descriptor f is calculated based on its local neighborhood.

In subprocess 440, the features, extracted in subprocess 435, are matched to the compact representations of template images $T_i$ in the reference database. In an embodiment, subprocess 440 comprises performing an approximate nearest neighbor search, in a search tree, for each descriptor f using the Hamming metric. The neighbors may be filtered, such that only those neighbors that are closer to descriptor f than a predefined threshold are considered. A voting scheme may be applied to the descriptors in the reference database that are matched to descriptors extracted from input image Q in subprocess 435. In particular, a match to a candidate descriptor $f_j^i$ in the reference database adds a vote to the template image $T_i$. Ultimately, the template images $T_i$ that have received votes may be sorted in descending order of the number of votes that they received, and the F best template images $T_i$ are selected from the sorted list. F may be any integer greater than or equal to one (e.g., one, two, three, five, ten, etc.).

2.2.3. Geometric Validation

In subprocess 445, the geometry of the features in input image Q, extracted in subprocess 435, is validated against each of the F best template images $T_i$ selected in subprocess 440. In an embodiment, subprocess 445 comprises calculating a RANSAC projective transformation hypothesis H for each of the candidate template images $T_i$ selected in subprocess 440. Each hypothesis H transforms points in the input image Q to points in the respective template image T within some margin of discrepancy. For a given hypothesis H, a pair of points, p and p', with similar descriptors is considered a valid match (i.e., inlier) if:

$|H(p)-p'|<\delta$, $p \in W(Q)$, $p' \in W(T)$, wherein δ is the inlier threshold.

As shown in Augereau et al., if only the general RANSAC parameters are used, the number of iterations and the inlier threshold δ are not sufficient for filtering out false hypotheses. Thus, in an embodiment, one or both of the following restrictions are used to provide additional filtering:

The distance between any two points, in a candidate template image T, which are used to construct the hypothesis, cannot be less than a minimum distance $d_{min}$.

The quadrangle from the input image Q must be convex and none of its corners can lie outside the frame by more than a maximum distance $d_{max}$ from the boundaries of the frame.

In general, the input image Q and a candidate template image T are connected with a projective transformation that can be computed using four pairs of matched points. In an embodiment, the classic iterative RANSAC scheme is complemented with information about the extracted lines and quadrangles as follows:

Each quadrangle that is found in the input image Q and which is geometrically valid yields an additional hypothesis that transforms the quadrangle's vertices to the corners of the template image T.

The selected lines are formed into clusters which define vanishing points. A pair of orthogonal vanishing points defines a transform $H_0$, such that $H=H_0 \times H_1$, in which $H_1$ is a supplementary transform that encodes image scale and shift. $H_1$ can be estimated using RANSAC. It is sufficient to use only two pairs of points to form the hypothesis $H_1$.

Let $G_i(H)$ denote the number of inliers of hypothesis H for a template image $T_i$. The hypothesis H* with the maximum number of inliers is selected as the result. If $G_i(H^*)$ is smaller than a predefined threshold R, the document type may be determined to be undefined. In the event that two candidates have the same number of inliers, an additional estimation may be calculated as follows:

$$e_i(H) = \frac{1}{G_i(H)} \sum_{j=0}^{G_i(H)} \frac{|H(p_j^Q) - p_j^i|}{\delta},$$

$\delta > 0$, $p_j^Q \in W(Q)$, $p_j^i \in W(T_i)$.

Figure 5B:
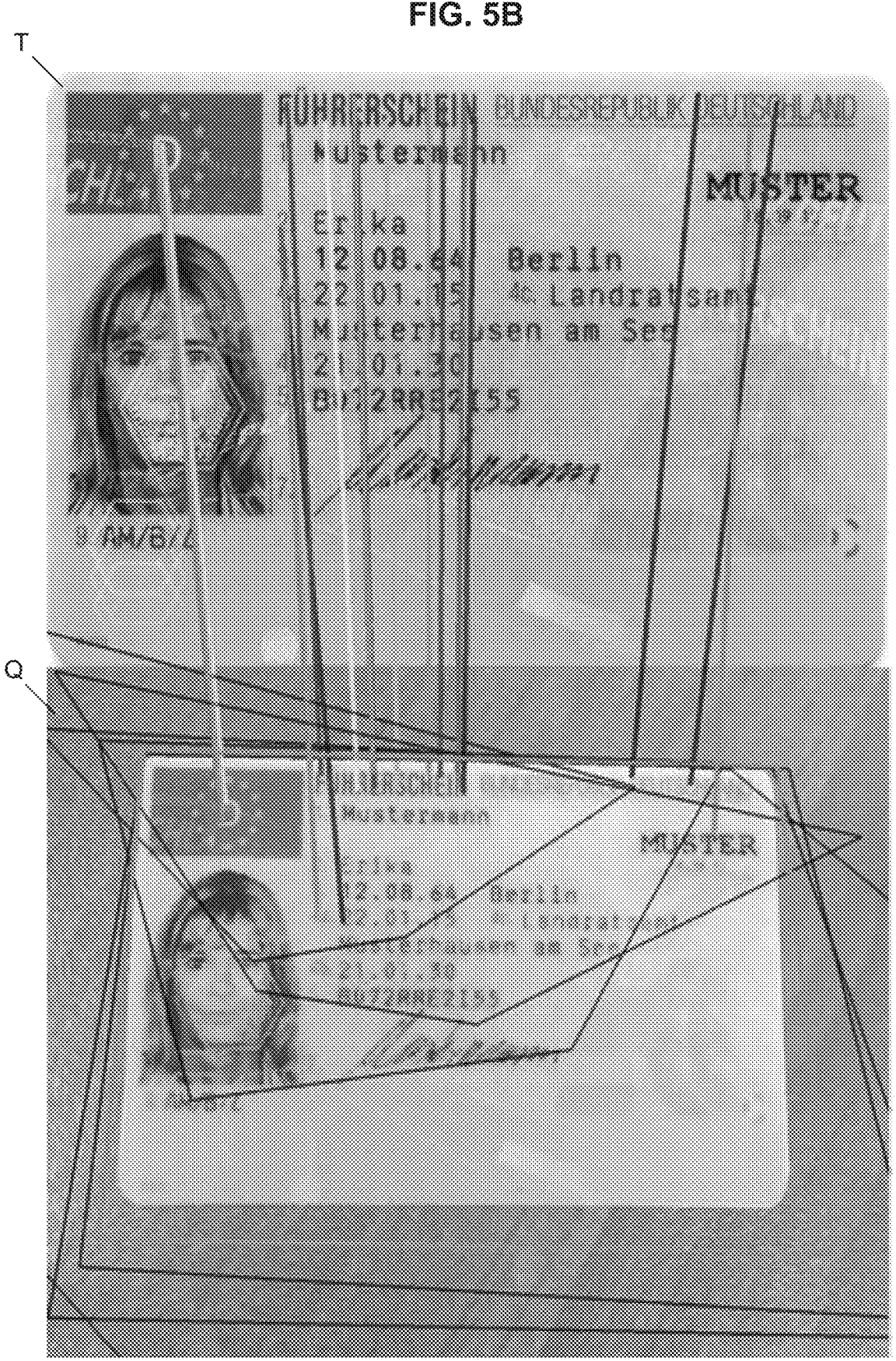

FIG. 5B illustrates an example of quadrangle hypotheses that were generated using RANSAC for an example of a template image T and input image Q, according to an embodiment. In this example, the template image T has poor structure of static elements. The best hypothesis (i.e., the final answer) for the quadrangle is highlighted by the lighter border.

If subprocess 445 determines that none of the candidate template images $T_i$ have valid geometries (i.e., "No" in subprocess 450), input image Q may be rejected in subprocess 455. Otherwise, if subprocess 445 determines that at least one of the candidate template images $T_i$ has a valid geometry (i.e., "Yes" in subprocess 450), the best candidate template image T that has a valid geometry may be selected in subprocess 460. The type of document associated with the selected template image T may be output in subprocess 460 (e.g., as an identifier that identifies the type of document). In addition, the distortion parameters of input image Q may be determined, based on the selected template image T, and output in subprocess 460. For example, the distortion parameters may comprise a homography matrix that relates the document's position in input image Q to the selected template image T. In an embodiment, the document type and distortion parameters, output by subprocess 460, may be utilized in one or more further subprocesses, as represented by subprocess 330 in process 300 in FIG. 3.

3. Example Experimental Evaluation

A particular implementation of the disclosed document recognition was tested and evaluated. For testing, the open Mobile Identity Document Video (MIDV) 500 dataset was used. The MIDV-500 dataset is described, for example, in "MIDV-500: A Dataset for Identity Documents Analysis and Recognition on Mobile Devices in Video Stream," Arlazarov et al., arXiv:1807.05786, 2018, which is hereby incorporated herein by reference as if set forth in full. The MIDV-500 dataset contains images of fifty different types of identity documents in two parts: (1) fifty source images; and (2) fifteen thousand video frames with a resolution of 1920×1080, obtained using smartphone cameras.

For evaluation of the client-side embodiment, 9,791 frames, in which the document is fully visible, were selected from the MIDV-500 dataset. To evaluate the server-side embodiment, an additional dataset, comprising both scanned images and photographs, was created. Specifically, this additional dataset comprised 250 scanned images with a resolution of 2400×1600, obtained using a Canon™ CanoScan LiDE 220 scanner, 250 photographs with a resolution of 4000×3000, captured using an Apple™ iPhone 7, and ground truth text files containing the coordinates of quadrangles, representing document boundaries, for each of the images. Samples were printed using an HP™ LaserJet printer and laminated.

The processing described in Arlazarov was used to prepare the document prototypes. The original source images of each type of document in the MIDV-500 dataset were used as template images $T_i$. The method in Awal et al. was used as a baseline for comparison to the disclosed document-recognition process. The method in Awal et al. was evaluated according to the description in Awal et al. and using the same template images $T_i$ and zones of variable data as used for the tested embodiment of the disclosed document-recognition module. For further comparison, the disclosed document-recognition process was modified to remove the line and quadrangle detection (e.g., subprocess 425), and this modified process was also evaluated. Below, Table 2 depicts the document classification and location accuracy for each tested method, and Table 3 depicts the average processing time for the Awal et al. method and the client-side and server-side embodiments of the disclosed method:

TABLE 2

Document Classification and Location Accuracy

| | Method | client-side (MIDV-500) | server-side (add'l dataset) |
|---|---|---|---|
| Classification | Awal et al. | 72.5% | 62.2% |
| | No Lines/Quadrangles | 46.1% | 31.8% |
| | Lines/Quadrangles | 76.0% | 67.6% |
| Location | No Lines/Quadrangles | 41.7% | 26.8% |
| | Lines/Quadrangles | 70.0% | 59.0% |

TABLE 3

Average Processing Time

| Method | Intel Core i7-4770S, 8 Gb RAM | Apple A8 (iPhone 6) |
|---|---|---|
| Awal et al. | 1.06 seconds | 4.22 seconds |
| Client-Side | 0.10 seconds | 0.35 seconds |
| Server-Side | 0.78 seconds | 2.82 seconds |

Since one ultimate goal of a recognition system is to extract the field values from the document, the criterion and threshold used in Skoryukina et al. were used. Specifically, location error was defined as the maximum deviation of the computed coordinates of the document corners, divided by the length of the shortest side of the document boundary. The document location is considered correct if the document type is correctly identified and the location error is less than 0.06. When evaluating computational performance, the time required for the detection of keypoints, the computation of descriptors, and the modification of the search data structures was not included. The values for performance and document classification presented in the tables were obtained with the following parameter values: the number of keypoints was restricted to 1,500 on input images and 450 on template images; the Hamming distance threshold for the neighbors search was 60 for 297-bit descriptors; the number of RANSAC iterations was 8,000 for hypotheses based on four-point pairs and on two-point pairs; the minimum distance $d_{min}$ was 50 (i.e., 10% of the minimum side of template images); and eight candidates were passed to RANSAC for geometric validation (i.e., F=8).

As shown in Table 2, the disclosed document-recognition method outperformed the Awal et al. method and the method that excluded lines and quadrangles detection, in terms of document classification accuracy, in both the client-side and server-side embodiments. The disclosed document-recognition method also outperformed the method that excluded lines and quadrangles detection, in terms of document location accuracy, in both the client-side and server-side embodiments. Notably, the Awal et al. method does not perform document location. In addition, as shown in Table 3, the disclosed document-recognition method outperformed the Awal et al. method in terms of average processing time, in both the client-side and server-side embodiments. Thus, the disclosed document-recognition algorithm outperformed prior algorithms in accuracy, while also having better computational performance.

4. Example Embodiments

As discussed herein, an embodiment of the disclosed process for document recognition is based on representing the image as a constellation of feature points and descriptors. However, in order to produce accurate distortion parameters, estimations of straight lines and quadrangles are extracted from an input image and used as additional features. In other words, the disclosed approach combines fast methods for detecting feature points with methods for locating lines and quadrangles, as opposed to prior methods which did not use these geometric primitives. While the geometric primitives of lines and quadrangles are less informative of local features, they are more computationally efficient. In addition, the disclosed process is capable of performing document location and classification simultaneously. The disclosed process also enables the matched points, lines, and quadrangles to be combined and used for geometric verification (e.g., using RANSAC). Best alternative selection criteria may be used, along with methods of estimating solution accuracy. Performance results demonstrate that the use of straight lines and quadrangles increases the accuracy of document location and results in the disclosed process outperforming prior methods in both classification precision and computational efficiency. Notably, the improvement in computational efficiency enables the disclosed process for document recognition to be performed on less powerful devices (e.g., mobile devices), on which document recognition may not otherwise be feasible.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   receive an input image;
   extract one or more lines from the input image;
   extract at least one quadrangle from the input image based on the one or more lines;
   determine one or more parameters based on the at least one quadrangle;
   extract a plurality of input keypoints from the input image based on the one or more parameters;
   calculate an input descriptor for each of the plurality of keypoints;
   match the plurality of input keypoints to a plurality of reference keypoints in a reference database, based on the input descriptor calculated for each of the plurality of input keypoints, to identify one or more classification candidates, wherein each of the one or more classification candidates represents a template image of a type of document;
   determine the type of document in the input image and one or more distortion parameters for the document based on the one or more classification candidates; and
   output the determined type of document and one or more distortion parameters.

2. The method of claim 1, wherein the reference database comprises a plurality of sets of reference keypoints and descriptors, wherein each of the plurality of sets represents one of a plurality of template images, and wherein each of the plurality of template images represents one of a plurality of types of document.

3. The method of claim 2, wherein at least one of the plurality of template images is represented by at least four sets of reference keypoints and descriptors in the reference database, and wherein each of the four sets represents one of the plurality of types of document rotated by a different amount of rotation than all others of the four sets.

4. The method of claim 3, wherein the different amounts of rotation for the four sets comprise 0°, 90°, 180°, and 270°.

5. The method of claim 2, further comprising, for each of the plurality of types of document:
   receiving the template image representing that type of document;
   extracting a plurality of reference keypoints from the template image;
   calculating a reference descriptor for each of the plurality of reference keypoints; and
   storing a compact representation of the template image in the reference database, wherein the compact representation comprises the plurality of reference keypoints and the reference descriptors calculated for the plurality of reference keypoints.

6. The method of claim 5, wherein each reference descriptor is stored in a hierarchical clustering tree.

7. The method of claim 5, wherein extracting a plurality of reference keypoints from the template image comprises excluding any keypoints that are within a region of the template image that has been identified as representing a field of variable data.

8. The method of claim 5, wherein extracting a plurality of reference keypoints from the template image comprises selecting the plurality of reference keypoints by:
   calculating a score for a plurality of candidate keypoints using a Yet Another Contrast-Invariant Point Extractor (YACIPE) algorithm; and
   selecting a subset of the plurality of candidate keypoints with highest scores as the plurality of reference keypoints.

9. The method of claim 5, wherein calculating a reference descriptor for each of the plurality of reference keypoints comprises calculating a receptive field descriptor for an image region around the reference keypoint.

10. The method of claim 9, wherein each reference descriptor comprises a vector of binary features.

11. The method of claim 1, wherein the one or more distortion parameters comprise a homography matrix.

12. The method of claim 1, further comprising extracting data from the input image based on the determined type of document and the one or more distortion parameters.

13. The method of claim 12, wherein the extracted data comprises one or more of text, an image, or a table.

14. The method of claim 1, wherein the one or more classification candidates comprise a plurality of classification candidates, and wherein the method further comprises using the at least one hardware processor to:
   calculate a rank for each of the plurality of classification candidates; and
   select one of the plurality of classification candidates based on the calculated ranks,
   wherein determining the type of document in the input image comprises identifying a type of document associated with the selected classification candidate.

15. The method of claim 14, wherein selecting one of the plurality of classification candidates comprises:
   selecting a subset of the plurality of classification candidates that have highest calculated ranks;
   performing a geometric validation with at least one of the classification candidates in the selected subset to identify the classification candidate as valid or invalid; and
   selecting one of the classification candidates, having a maximum calculated rank, from the classification candidates in the selected subset that are identified as valid.

16. The method of claim 15, wherein the geometric validation with each of the one or more classification candidates comprises:

calculating a transformation matrix that maps input keypoints in the input image to reference keypoints in the template image represented by the classification candidate;
when the mapping is within a predefined accuracy, determining that the transformation matrix is valid; and,
when the mapping is not within the predefined accuracy, determining that the transformation matrix is invalid.

17. The method of claim 16, wherein the transformation matrix is a Random Sample Consensus (RANSAC) transformation matrix.

18. The method of claim 17, wherein, for each of the one or more classification candidates, the transformation matrix transforms vertices of the at least one quadrangle to corners of the template image represented by the classification candidate.

19. The method of claim 17, wherein, for each of the one or more classification candidates, the transformation matrix is constrained by one or both of the following:
a distance between any two reference keypoints is greater than a minimum distance threshold; or
the at least one quadrangle is convex and no vertices of the at least one quadrangle lie outside the input image by more than a maximum distance threshold.

20. The method of claim 1, wherein extracting one or more lines from the input image comprises applying a Hough transform to transform at least a portion of the input image into a Hough parameter space.

21. The method of claim 20,
wherein extracting one or more lines from the input image comprises, for each of a plurality of regions of interest in the input image,
calculating a grayscale boundaries map, and,
iteratively until a predefined number of candidate lines are identified,
applying a Fast Hough Transform to the boundaries map to produce a Hough parameter space,
identifying a candidate line with a highest value in the Hough parameter space, and,
if a number of identified candidate lines is less than the predefined number of candidate lines, erasing boundaries in a neighborhood of the identified candidate line with the highest value in the Hough parameter space, and
wherein extracting at least one quadrangle from the input image comprises
generating a plurality of candidate quadrangles using pairwise intersection of the identified candidate lines across at least two of the plurality of regions of interest,
for each of the plurality of candidate quadrangles, calculating a weight for the candidate quadrangle based on weights associated with constituent lines of the candidate quadrangle, and
selecting the at least one quadrangle from the plurality of candidate quadrangles based on the calculated weights for the plurality of candidate quadrangles.

22. The method of claim 20, wherein the one or more lines comprise a plurality of lines, and wherein extracting at least one quadrangle from the input image comprises:
classifying each of the plurality of lines as either mostly horizontal or mostly vertical;
generating an intersections graph based on the classifications of the plurality of lines, wherein each vertex in the intersections graph represents one of the plurality of lines, and wherein each edge in the intersections graph represents an intersection point of two of the plurality of lines;
tagging each edge in the intersections graph with a corner type that corresponds to the represented intersection point;
identifying one or more cycles in the intersections graph, wherein each cycle comprises four edges that are all tagged with different corner types; and
selecting one of the one or more cycles as the at least one quadrangle based on a weighting.

23. The method of claim 1, wherein the one or more parameters comprise one or both of a scale and a rotation angle of the at least one quadrangle.

24. The method of claim 23,
wherein extracting the at least one quadrangle comprises
determining a weight for each of one or more candidate quadrangles extracted from the input image based on the one or more lines, and
identifying one of the one or more candidate quadrangles with a highest weight as the at least one quadrangle, and
wherein determining one or more parameters based on the at least one quadrangle comprises
when the weight for the at least one quadrangle is greater than a predefined threshold, using a scale and rotation angle of the at least one quadrangle as the scale and the rotation angle in the one or more parameters, and,
when the weight is less than the predefined threshold, using a default value for the scale in the one or more parameters, and determining the rotation angle in the one or more parameters by
sorting constituent lines of the one or more candidate quadrangles that comply with geometric restrictions by an angle between each constituent line and a reference line,
identifying a single constituent line for which an angular window includes a maximum number of constituent lines, and
using the angle between the identified constituent line and the reference line as the rotation angle in the one or more parameters.

25. A system comprising:
at least one hardware processor; and
one or more software modules that, when executed by the at least one hardware processor,
receive an input image,
extract one or more lines from the input image,
extract at least one quadrangle from the input image based on the one or more lines,
determine one or more parameters based on the at least one quadrangle,
extract a plurality of input keypoints from the input image based on the one or more parameters,
calculate an input descriptor for each of the plurality of keypoints,
match the plurality of input keypoints to a plurality of reference keypoints in a reference database, based on the input descriptor calculated for each of the plurality of input keypoints, to identify one or more classification candidates, wherein each of the one or more classification candidates represents a template image of a type of document, determine the type of document in the input image and one or more distortion parameters for the document based on the one or more classification candidates, and output the determined type of document and one or more distortion parameters.

26. A non-transitory computer-readable medium having instructions stored therein, wherein the instructions, when executed by a processor, cause the processor to:

receive an input image;

extract one or more lines from the input image;

extract at least one quadrangle from the input image based on the one or more lines;

determine one or more parameters based on the at least one quadrangle;

extract a plurality of input keypoints from the input image based on the one or more parameters;

calculate an input descriptor for each of the plurality of keypoints;

match the plurality of input keypoints to a plurality of reference keypoints in a reference database, based on the input descriptor calculated for each of the plurality of input keypoints, to identify one or more classification candidates, wherein each of the one or more classification candidates represents a template image of a type of document;

determine the type of document in the input image and one or more distortion parameters for the document based on the one or more classification candidates; and output the determined type of document and one or more distortion parameters.

* * * * *